Figure 1:
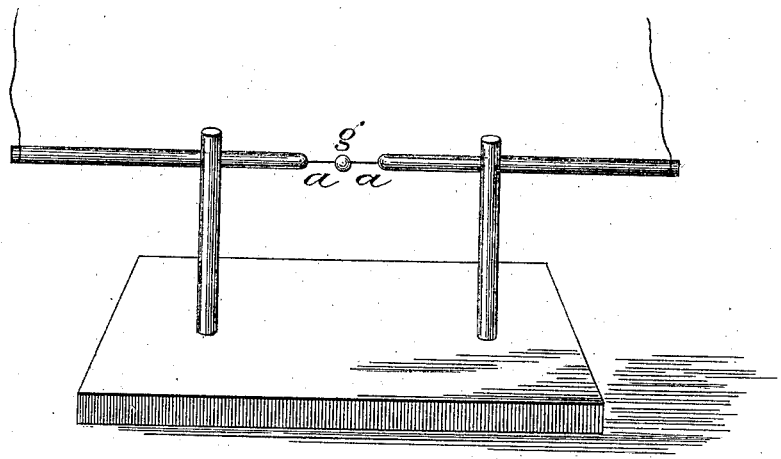

P. O. JENKINS.
Electric Light.

No. 212,851.  Patented Mar. 4, 1879.

Witnesses:
M. Gardner
Alex. Scott

Inventor:
Philip O. Jenkins

United States Patent Office.

PHILIP O. JENKINS, OF WASHINGTON, DISTRICT OF COLUMBIA.

IMPROVEMENT IN ELECTRIC LIGHTS.

Specification forming part of Letters Patent No. 212,851, dated March 4, 1879; application filed October 22, 1878.

*To all whom it may concern:*

Be it known that I, PHILIP O. JENKINS, now a resident of the city and county of Washington, in the District of Columbia, have invented a new and useful Improvement for Utilizing Electric Light, which improvement is set forth in the following specification, reference being had to the accompanying drawing.

This device furnishes a constant, brilliant, and yet economical incandescent light, which may be used for lighting streets or other open places, but will be more particularly useful in lighting churches, halls, factories, light-houses, and other buildings, public or private; also, mines and vessels used in navigation.

In the annexed drawing, the figure represents the electric circuit closed upon a platinum wire or strip, or such other suitable material, placed in the break between the poles, the capacity of which shall be so disproportioned as a conductor to the electricity behind it that it will develop and maintain the incandescent light required, as shown by letters $a\ a$ in the drawing. This wire or strip, or its equivalent, may be of any size required; and in order to give radiating-surface for the light, I use a hollow sphere, or, at my pleasure, a hemisphere, (or it may be spheroidal in form,) in its center, at letter $g$, made of thin platinum or other material, such as can be brought to a state of incandescence.

I close the circuit, as before stated, on the platinum or other substance, at $g$, in a spherical or spheroidal form, because it, in that form, furnishes a more extensive radiating-surface, as the rays of light, according to the laws of incidence and reflection, will radiate at right angles from every portion of the outer surface of the spherical or spheroidal substance at $g$, which in the case of a complete sphere would be a radiation of three hundred and sixty degrees, while the radiation from a flat or plane surface will only radiate in parallel lines, and the source of radiation being small will necessarily limit the light.

This device, when a current of electricity passes through it, produces the incandescent light as contradistinguished from that produced on carbon points.

This wire or strip connecting the spherical body with the electrodes should be sufficiently large to allow the electricity to flow freely up to the point of resistance, which is the sphere. The wires, and also the sphere, should be constructed considerably larger than would be indicated by the drawing.

In the use of this light, for the purpose of lighting any place desired with uniformity, and at the same time counteracting the tendency to disagreeable shadows from intervening objects, I use primary and secondary reflectors, in such manner as to cause one, in such degree as may be necessary, to oppose another, and according to the known laws of incidence and reflection.

To subdue and soften the light, which otherwise might be so brilliant as to pain the eyes, I use ground or stained glass, porcelain, mica, or other suitable material, which may be of globe form and placed around the light, or a semi-globe form and placed in front of a reflector.

What I claim in my device for incandescent electric lighting is—

A hollow spherical, hemispherical, or spheroidal body, made of platinum or other suitable material, said body to be brought to incandescence by closing the electrical circuit upon it, as and for the purposes herein set forth.

P. O. JENKINS.

Witnesses:
GEO. W. LOCKWOOD,
WM. B. JONES.